M. J. HUSAK.
ENGINE CONNECTING ROD TEST GAUGE.
APPLICATION FILED DEC. 21, 1921.
1,436,104.
Patented Nov. 21, 1922.
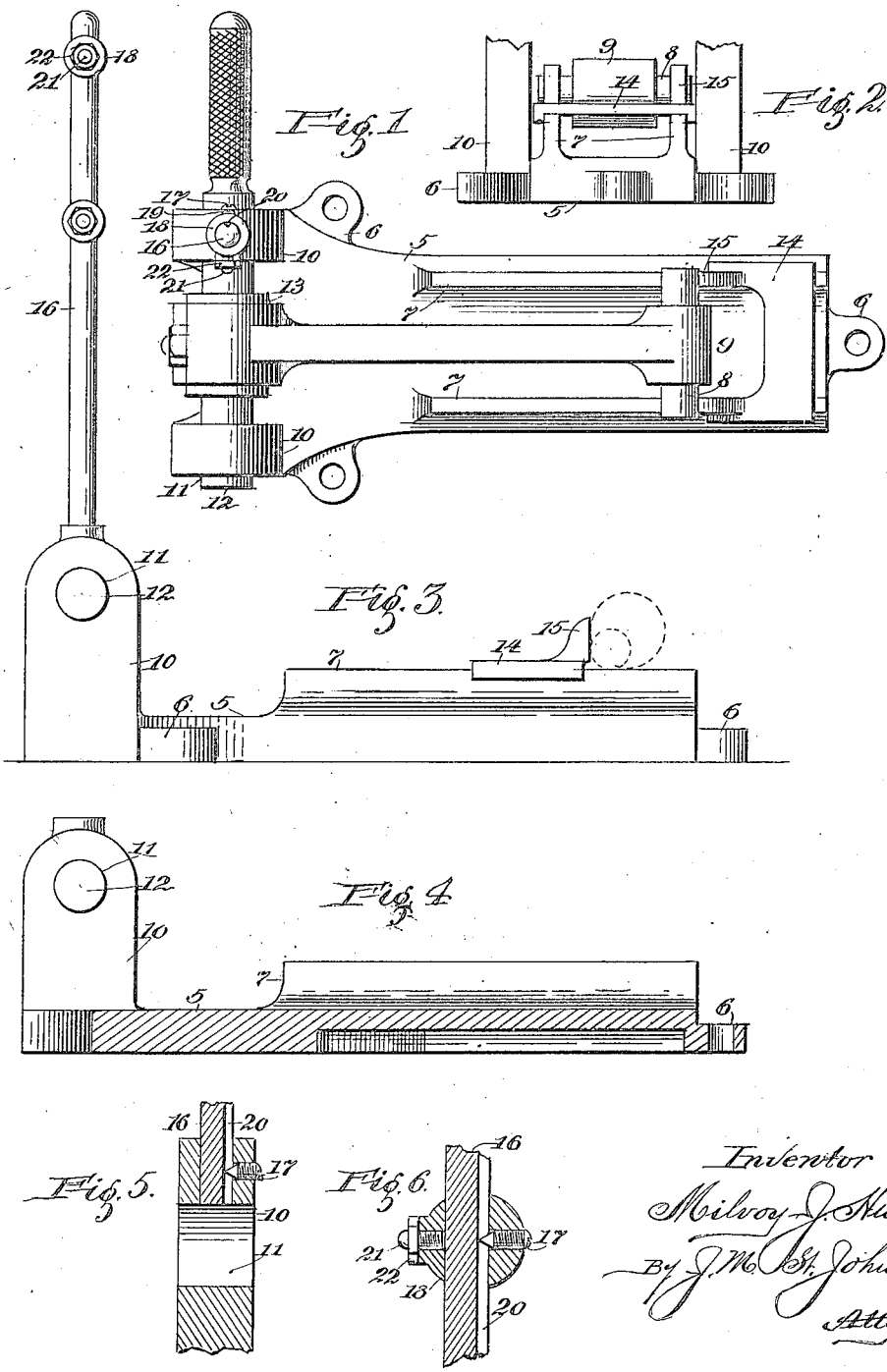

Patented Nov. 21, 1922.

1,436,104

UNITED STATES PATENT OFFICE.

MILVOY J. HUSAK, OF CEDAR RAPIDS, IOWA.

ENGINE-CONNECTING-ROD TEST GAUGE.

Application filed December 21, 1921. Serial No. 524,005.

*To all whom it may concern:*

Be it known that I, MILVOY J. HUSAK, a citizen of the United States, residing at Cedar Rapids, in the county of Lime and State of Iowa, have invented certain new and useful Improvements in Engine-Connecting-Rod Test Gauges; and I do hereby declare the following to be a full, clear, and exact description of the invention, such as will enable others skilled in the art to which it appertains to make and use the same.

This invention relates to the fitting of crank connecting rods for automobile engines, and the object of the invention is to provide apparatus whereby the parallelism of the piston-pins with the crank-bearings of such rods may be accurately tested, and deviations from accuracy may be corrected.

The invention is fully disclosed in the description and claims following, reference being had to the acompanying drawing, in which:

Fig. 1 is a plan view of my improved test-gauge as in use. Fig. 2 is a fragmentary view of the same, as seen from the right end of Fig. 1. Fig. 3 is a side elevation of the gauge. Fig. 4 is a central, longitudinal section of the bed-plate. Fig. 5 is a vertical section of the lug which supports the vertical gauge-rod, a fragment of which is also shown. Fig. 6 is a similar section of the rod and one of the slides attached thereto.

In the drawing, the numeral 5 denotes a base-plate adapted to be bolted to a supporting bench, or the like, by lugs 6. Rising from the bed-plate are ribs 7, which are machined and finished to be accurately parallel at the top, and for a distance down their outer sides. The upper surfaces of the ribs form test-bearings for the piston-pin 8 when inserted in the connecting-rod 9. At the opposite end of the bed-plate rise lugs 10, which are bored at 11 exactly parallel with the surfaces of the ribs, to receive a mandrel 12 with a nice sliding fit. The body of the mandrel is of a size corresponding to the smallest of the cranks in general use, so that the crank end of its connecting-rod will fit thereon. For connecting-rods with larger bearings bushings 13 are provided, one only being shown, but a considerable assortment being required in practice, since the diameters of these cranks vary in the different makes of automobile engines.

The connecting-rod being mounted on the mandrel, as shown in Fig. 1, and the piston-pin being brought down to the ways, it is evident that any twist in the connecting-rod, or want of parallelism as between the mandrel and the pin will at once appear. The workman corrects this by a counter-twist with a wrench. To enable him to do this quickly, the whole base is made strong enough to resist the strain, and instead of removing the connecting-rod, setting it in a vise, and there guessing at the amount of twist to give it, the workman performs the whole operation while the rod is in testing position, and in a fraction of the time required for repeated removals, twists and replacements.

It may happen, however, that the pin is out of parallelism in a plane lengthwise of the rod. To test it in this direction, a slide-plate 14 is provided, which fits nicely over the ways, and is slidable thereon. This slide has upstanding abutments 15, with testing faces exactly at right angles to the ways. The test faces are preferably of a height to contact with the middle of a pin of any diameter, as indicated by the dotted outlines in Fig. 3. When the slide is set to the position shown in Fig. 1, any deviation from accuracy in the direction above indicated will appear, and may be corrected by slightly bending the connecting-rod.

The accuracy of the pin being established, it still remains to test the accuracy of the piston when adjusted to working position on the pin. For this purpose one of the lugs 10 is provided with an upstanding post 16, suitably secured, as by a set-screw 17. On this post is mounted a pair of abutment slides 18, secured adjustably at any desired height by set-screws 19. To avoid any axial deviation in shifting the slides, the set-screws are made to register with a longitudinal groove 20 in the post. Opposite the set-screws the slides are provided with screw-threaded abutment pins 21, with set-nuts 22, whereby the pins may be adjusted with perfect accuracy to an alignment exactly at right angles to the axis of the mandrel. Assuming now the piston to be in assembled position on the piston-pin, the connecting-rod is turned upwardly, when a side of the piston will be presented to the test-pins. If both pins touch the median line of the piston, the whole job is accurate. If not, the fault is in the boring of the pin-holes in the piston, which must needs be corrected, if possible, or wholly discarded.

The apparatus thus described provides a simple, expeditious and reliable means for testing and justifying the bearings of engine connecting-rods, as almost universally made and used. By it a workman of moderate skill may test and finish the assembling of a job, if he is careful in observing the necessary steps, and careful in noting results.

Having thus described my invention, I claim:

1. A connecting-rod test-gauge, comprising an elongated base provided with longitudinal parallel ways having upper testing surfaces, and lugs bored for a mandrel at right angles to the ways and parallel with said testing surfaces, a post rising from one of the lugs at right angles to the bores, and inwardly projecting testing abutments mounted adjustably on said post, and adapted to touch at separate points a piston attached to a connecting-rod supported in the bores in said lugs.

2. A connecting-rod test-gauge, comprising a base provided with mandrel-receiving lugs, a post rising from one of the lugs and rigidly secured thereto, and provided with a longitudinal guide-groove, testing abutments slidable on said post, and fastening means therefor engaging said groove, whereby they may be shifted without axial deviation.

3. A connecting-rod test-gauge, comprising a base provided with mandrel-receiving lugs, a longitudinally grooved post rising from one of them, abutment slides mounted on the post, set-screws therefor engaging the groove, inwardly projecting abutment-pins screwed in the slides, and lock-nuts therefor.

In testimony whereof I affix my signature in presence of two witnesses.

MILVOY J. HUSAK.

Witnesses:
J. L. RHEA,
D. C. WOOD.